April 30, 1935.  J. A. REYNOLDS  1,999,342
ROACH TRAP
Filed Sept. 27, 1934  2 Sheets-Sheet 1

Inventor
J. A. Reynolds

By *Clarence A. O'Brien*
Attorney

April 30, 1935. J. A. REYNOLDS 1,999,342
ROACH TRAP
Filed Sept. 27, 1934 2 Sheets-Sheet 2
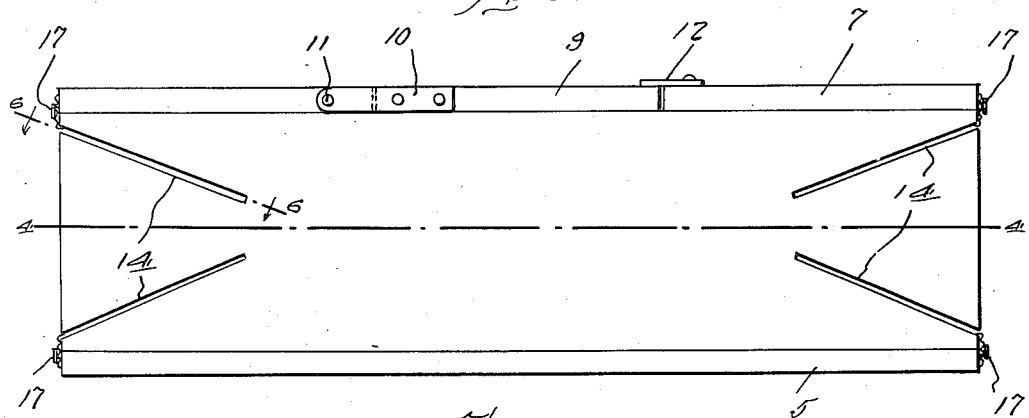
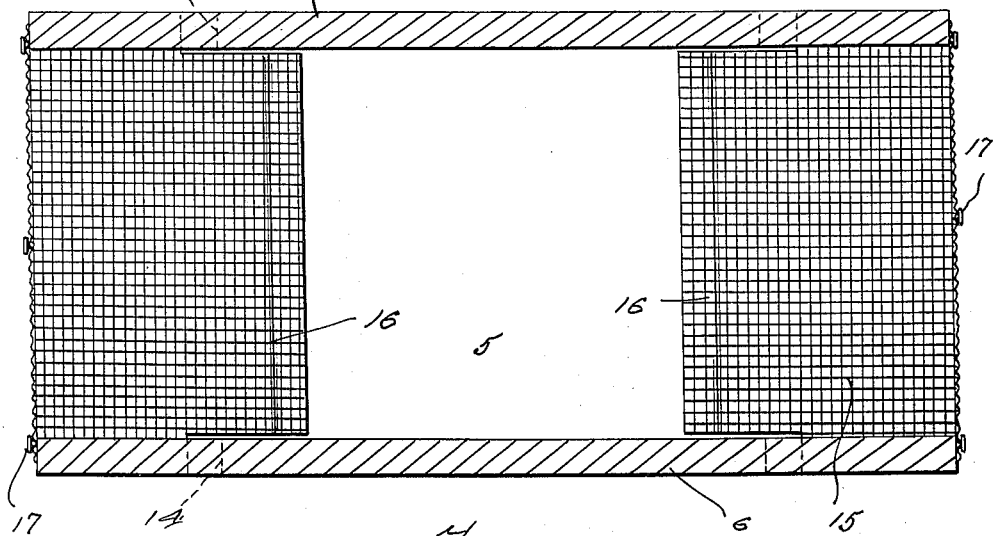
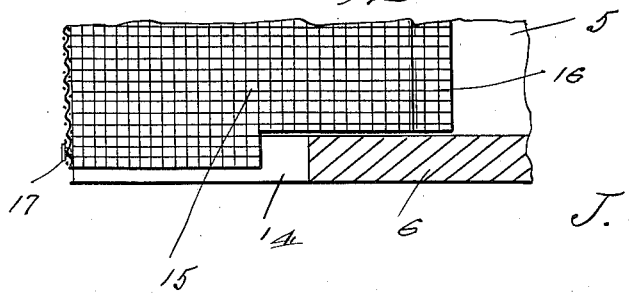
Inventor
J. A. Reynolds
By Clarence A. O'Brien
Attorney Patented Apr. 30, 1935

1,999,342

UNITED STATES PATENT OFFICE 1,999,342

ROACH TRAP

John A. Reynolds, Miccosukee, Fla.

Application September 27, 1934, Serial No. 745,779

6 Claims. (Cl. 43—121)

The present invention relates to a roach trap and has for its prime object to provide a trap which is exceedingly simple in its construction, inexpensive to manufacture, handy, compact in its arrangement of parts, thoroughly efficient and reliable in use.

Another more specific object of the invention resides in the provision of a trap having a novel arrangement of screens and flaps.

With the above and numerous other objects in view as will appear as the description proceeds, the invention consists in certain novel features of construction, and in the combination and arrangement of parts as will hereinafter be more fully described and claimed.

In the drawings:

Figure 3 is a side elevation of the trap.

Figure 4 is a horizontal longitudinal section taken substantially on the line 4—4 of Figure 3.

Figure 6 is a detail sectional view taken substantially on the line 6—6 of Figure 3.

Figure 1:
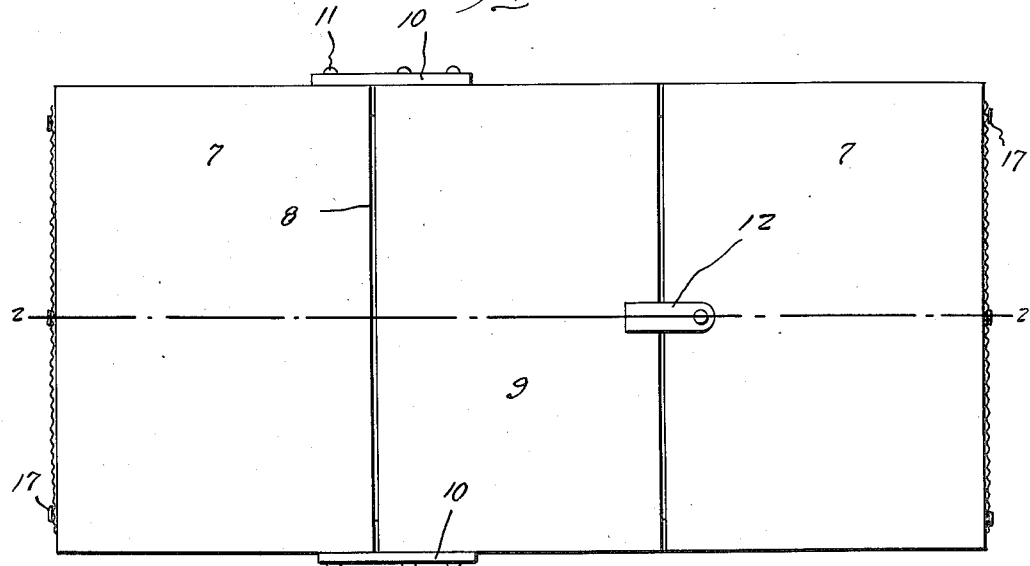
Figure 1 is a top plan view of a trap embodying the features of my invention.
Figure 2:
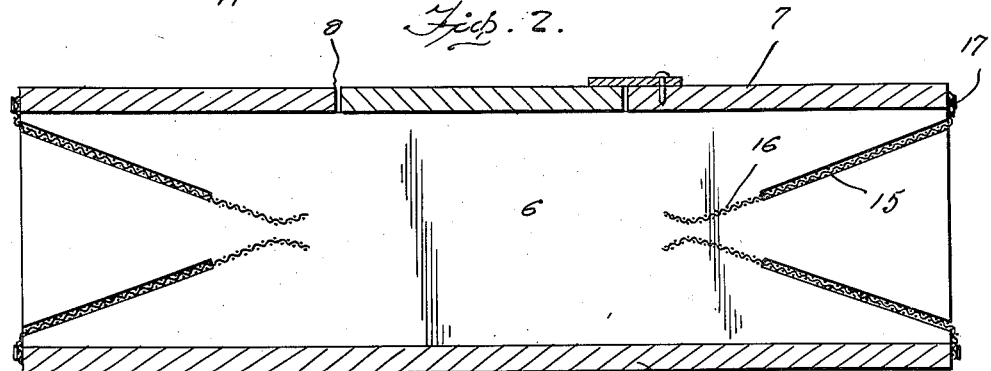
Figure 2 is a vertical longitudinal section therethrough taken substantially on the line 2—2 of Figure 1.
Figure 5:
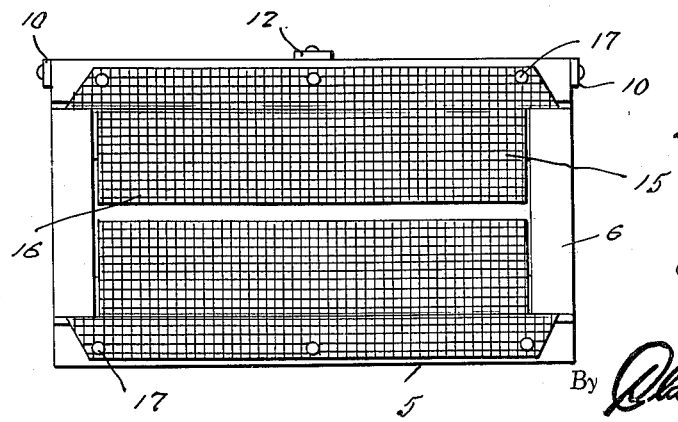
Figure 5 is an end elevation of the trap.

Referring to the drawings in detail it will be seen that the body of the trap is in the form of an open ended box like structure made up of a bottom 5 from which rise sides 6 and across the upper edges of the side 6 is the top 7. The top 7 is provided with a central opening 8 in which is normally disposed a cover panel 9. The cover panel 9 has strips 10 secured thereto and these strips are swingable on pins 11 thereby providing a hinge mounting for the cover panel. A latch 12 holds the panel in closed position.

At each end of each side there are a pair of slots 14 which start at the end edge of the side and converge inwardly toward each other terminating in spaced relation. At each end of the trap there are a pair of screen members 15 the side edges of which extend into the slot 14 and the inner ends of these screens are narrow and free to form flaps 16. The outer ends of the screens are nailed or otherwise secured to the end edges of the bottom and top as indicated at 17.

It will be seen that when suitable bait is placed in the box like body structure the roaches enter through either end but cannot exit.

It is thought that the construction, utility and advantages of this trap will now be quite apparent to those skilled in this art without a more detailed description thereof.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A trap of the class described comprising an open ended box like body the sides of which are provided at their ends with slots, a pair of slots in each end of each side and said slots converging inwardly toward each other, and screen panels having sides extending into the slots, the inner ends of the panels being narrowed to form free flaps.

2. A trap of the class described comprising an open ended box like body the sides of which are provided at their ends with slots, a pair of slots in each end of each side and said slots converging inwardly toward each other, and screen panels having sides extending into the slots, the inner ends of the panels being narrowed to form free flaps, the top of the body being provided with an opening and a closure for said opening.

3. A trap of the class described comprising an open ended box like body the sides of which are provided at their ends with slots, a pair of slots in each end of each side and said slots converging inwardly toward each other, and screen panels having sides extending into the slots, the inner ends of the panels being narrowed to form free flaps, the top of the body being provided with an opening and a closure for said opening, the outer ends of the panels being bent over the end edges of the top and bottom of the body and secured thereto.

4. A trap of the class described comprising a body having an open end and the sides of the body at said end each being provided with a pair of slots converging inwardly toward each other and terminating in spaced relation, a pair of screen panels having side edges fixed in the slots and having their inner ends narrowed and extended inwardly to provide free flaps.

5. A trap of the class described comprising a body having an open end and the sides of the body at said end each being provided with a pair of slots converging inwardly toward each other and terminating in spaced relation, a pair of screen panels having side edges fixed in the slots and having their inner ends narrowed and extended inwardly to provide free flaps, and the terminals of the slots diverging from each other.

6. A trap of the class described comprising a body having an open end and the sides of the body at said end each being provided with a pair of slots converging inwardly toward each other and terminating in spaced relation, a pair of screen panels having side edges fixed in the slots and having their inner ends narrowed and extended inwardly to provide free flaps, and the terminals of the slots diverging from each other, the outer ends of the screen panels being bent over the edges of the top and bottom of the open end of the body and secured thereto.

JOHN A. REYNOLDS.